Aug. 26, 1958     G. W. HEISE ET AL     2,849,521
MULTI-PLY WASHER FOR THE PREVENTION
OF ELECTROLYTE CREEPAGE
Filed Sept. 21, 1954

INVENTORS
GEORGE W. HEISE
NELSON C. CAHOON
BY John F. Hohmann
ATTORNEY

United States Patent Office 2,849,521
Patented Aug. 26, 1958

2,849,521

MULTI-PLY WASHER FOR THE PREVENTION OF ELECTROLYTE CREEPAGE

George W. Heise and Nelson C. Cahoon, Fairview Park, Ohio, assignors to Union Carbide Corporation, a corporation of New York Application September 21, 1954, Serial No. 457,508

5 Claims. (Cl. 136—133)

This invention relates to primary galvanic cells, and in particular to a method of simultaneously preventing so-called electrolyte creepage and air-line corrosion in dry cells.

It has long been observed that upon severe drain, storage at high temperatures, or as a result of inadvertent over-compression of the mix during assembly, free electrolyte often creeps over the emergent surface of the anode metal, and may even find its way between container and seal to the outside of the cell. When this electrolyte creepage is serious, salt deposition occurs; however, prior to crystallization, droplets of electrolyte often accumulate on the cover of the unit with the consequent formation of local short circuits, which cause cell discharge and reduce voltage. Further, when a cell so affected is present in battery operated equipment, the escaping electrolytic solution readily corrodes the metallic parts of the cell receptacle. Where this equipment is costly, as in the case of hearing aids, this effect may have expensive consequences. In addition, cells which are not properly sealed are subject to drying-out, and may suffer from air-line corrosion of the zinc anode at the top of the mix bobbin. Such corrosion results in perforation of the zinc can, and decreases the shelf life of the cell. It is also likely that the resultant diminution in the quantity of electrolyte causes the mix bobbin to shrink, thereby increasing the internal resistance of the cell and decreasing the electrical output of the unit.

To remedy these difficulties, several methods of sealing and lining dry cells have been suggested and tried, with only partial success. Thus, with improved sealing means of wax or pitch, creepage was observed to progress along the inner zinc container, and over the seal, because the unsatisfactory adhesion between zinc and the sealing material results in a seam between these elements. Hermetic sealing of the cell, for its part, is unsatisfactory unless sufficient means are provided to absorb the evolved gases. To a lesser extent, similar difficulties have been encountered in the use of sealing lacquers.

It is accordingly the primary object of this invention to provide a cell construction having inhibiting means in the way of the potentially creeping electrolyte so disposed as to absorb the latter, immobilize it by swelling, and bar its possible advance along the surface of the electrode elements.

It is another object of this invention to improve the shelf life and delayed service capacity of such cells by reducing air line corrosion to a minimum.

These and other related objects and features are disclosed in the following specifications, and in the accompanying drawings in which.

Essentially the invention comprises a cell construction in which a washer consisting of at least one layer of a colloidal material capable of swelling in cell electrolyte to form a gel partially covers the top of the cell mix and is directly in contact with the anode. As hereinafter described, the preferred embodiment of the invention is a multi-ply washer consisting of a plurality of bibulous disks separated by colloidal material.

Figure 1:
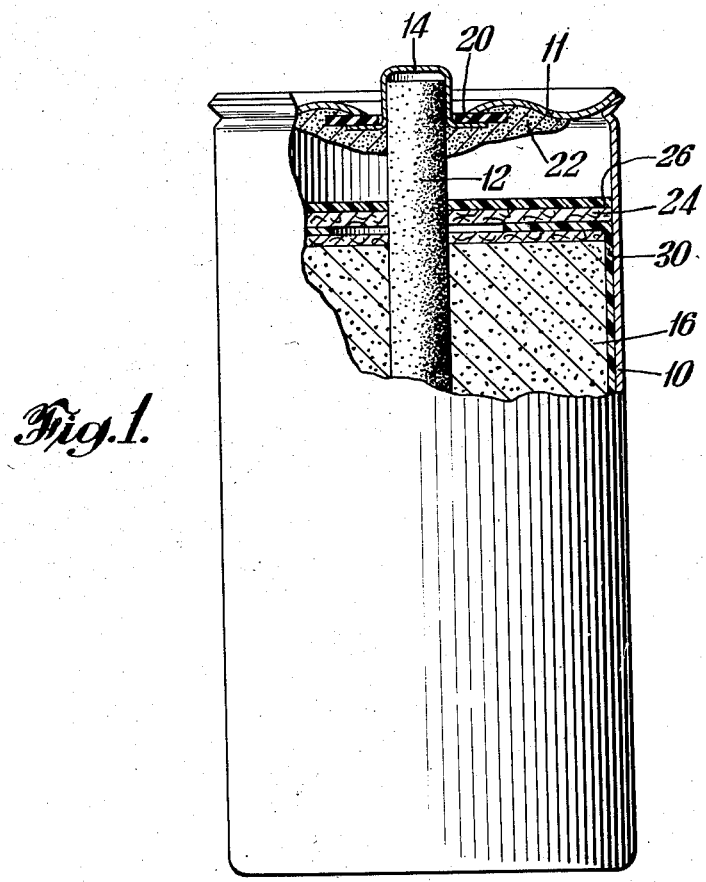
Fig. 1 shows by way of example in longitudinal section, a dry cell construction embodying the multi-ply washer of the invention.

In the drawings the conventional cell shown in Fig. 1 comprises a zinc electrode 10, a metal cover 11, a carbon electrode 12 having a brass terminal cap 14, a cathode mix 16 composed of manganese dioxide and carbonaceous particles, an insulating washer 20, a wax inner seal 22, and a turned-down electrolyte-resisting film liner 30, such as that disclosed in U. S. Patent No. 2,534,336, issued December 19, 1950. Thus, in all respects this cell is of conventional design, except that between the turned-down film liner 30 and the top closure 22, it contains a multi-ply washer consisting of a bibulous paper ring 24 of such a size as to fit tightly within the cell container, and of a colloidal film layer 26. This washer is, in effect, a colloid-paper laminate prepared by spreading a 10% solution by weight of a colloidal material such as sodium carboxymethyl cellulose solution having a viscosity of approximately 4000 cps. on strips of paper and laminating these before allowing them to dry. The washer then can be punched from the resulting sheet after it has been dried in air. The colloidal material when penetrated by the electrolyte, absorbs it while simultaneously expanding and swelling, thereby preventing creepage of the electrolyte.

Figure 2:
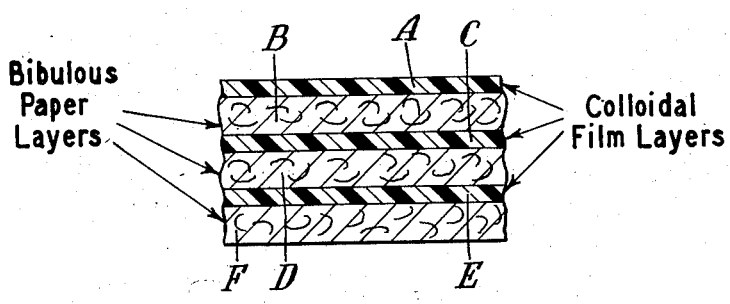
Fig. 2 is a cross-sectional view of the bibulous paper ring construction of the same washer.
Figure 3:
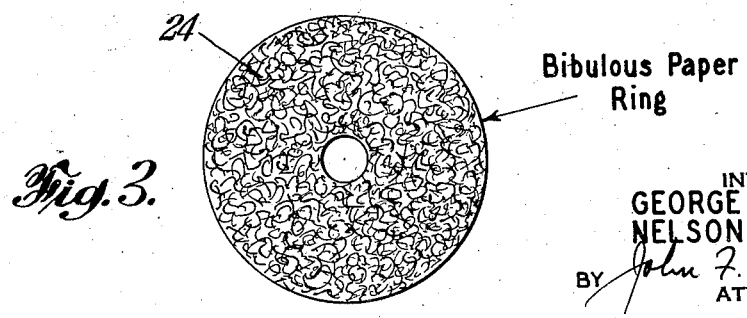
Fig. 3 shows a top view of a multi-ply washer made in accordance with this invention.

For further purposes of illustration, this washer is shown on Fig. 2 as consisting of three layers of bibulous material, such as paper, B, D, and F, separated by colloidal film layers A, C and E.

As prevention of electrolyte creepage depends on the development of an electrolyte-gel contact with the zinc anode at the top edge of the mix, it is important that the edges of the washer be directly in contact with the zinc; the presence of the gell preventing the release of free electrolyte for creepage along the surface of the anode. At the same time, by virtue of the retentive properties of the washer arrangement, the possibility of the cell drying out, and of air line corrosion of the zinc occurring near the top of the cell mix, with consequent perforation of the can, is practically eliminated.

In the practice of this invention, any suitable cell assembly procedure may be followed. One preferred method of construction consists in packing the depolarizing mix in the film-lined container, inserting the electrode, using sufficient pressure to plasticize the mixture, turning down the protruding edges of the liner, and placing the multi-ply-collar washer over the turned down liner in such a way as to have a layer of colloid on the surface farthest from the mix. By placing the washer over the turned down film liner, the colloidal material in the multi-ply washer is efficiently retained and prevented from diffusing into the mix bobbin.

Among colloids capable of swelling in cell electrolyte to form gels are starch (cereal), alkyl cellulose ethers such as methyl cellulose, hydroxy alkyl cellulose ethers, polyvinyl alcohol, salts of cellulose glycolic acid, locust bean gum and guar gum; either dry or where available in that form in solutions having viscosities between 4000 and 100,000 cps. Of these, the electrolyte-soluble plastic synthetic materials are preferred since they do not hydrolyze under dry cell conditions, and are quite stable at high temperatures.

In this latter case, sodium carboxymethyl cellulose is preferred, as it remains electrolyte-soluble and, therefore, active as an immobilizing agent. In effect, during shelf life tests conducted at 45° C.—a test condition much more severe than that encountered in actual operation—on cells fitted with multi-ply washers containing this material, the superiority of the multi-ply washer construction over conventional or control cells was clearly demonstrated as shown in Table I in which the percentage of leaky cells is compared for a period as long as 10 weeks.

Table I

| Colloidal material | 45° C. storage | | | | | |
|---|---|---|---|---|---|---|
| | 1 wk. | 2 wks. | 3 wks. | 4 wks. | 7 wks. | 10 wks. |
| Control | 70 | 70 | 80 | 100 | 100 | |
| Methyl cellulose [1] | 90 | 90 | 90 | 100 | 90 | |
| Cereal [1] | 20 | 20 | 20 | 30 | 60 | |
| Sodium carboxymethyl cellulose [1] | 0 | 20 | 20 | 30 | 30 | 40 |

[1] Multi-ply top washers.

Table II indicates shelf readings at 21° C., comparing the shelf life of cells of the present construction with that of conventional construction used as control Table II

| Colloid in washer | Characteristics of cells after storage for— | | | | | |
|---|---|---|---|---|---|---|
| | 1 week | | 6 months | | 2 years | |
| | Volts | Amps.[1] | Volts | Amps.[1] | Volts | Amps.[1] |
| None | 1.59 | 4.3 | 1.54 | 2.6 | 1.51 | 1.6 |
| Cereal paste | 1.57 | 4.0 | 1.52 | 2.5 | 1.51 | 1.7 |
| NACMC [2] | 1.57 | 4.1 | 1.54 | 2.9 | 1.52 | 2.3 |

[1] Average.
[2] Sodium carboxymethyl cellulose.

While for illustrative purposes only, this invention has been discussed with specific reference to film-lined cells having container anodes, and especially zinc anodes, it is to be noted that its application is not limited thereto. On the contrary, the multi-ply washers of the invention are also suitable for preventing creepage along other varied types of surfaces, such as those of cells having plastic containers fabricated of, for example, polyethylene and are equally applicable to anodes of all composition, including aluminum, magnesium and other metals, provided a colloid dispersible or at least partially soluble in the electrolyte activating these metals is selected. Furthermore, this invention is not limited to film lined cells, but is equally applicable to other constructions such as paste-lined cells.

By the present invention, an improved cell construction is provided, being superior over conventional constructions, in that it is substantially free from electrolyte creepage and air line corrosion. This superiority makes for longer shelf life, and delayed activity.

Changes may be effected as desired in the size, form and relative composition of the component parts of this invention without departing from its range, or the scope of its claims.

What is claimed is:

1. A method of eliminating electrolyte creepage in dry cells, which comprises at least partially covering the electrolyte-wet depolarizing mix body with a multi-ply washer comprising a plurality of absorbent materials separated by an electrolyte-immobilizing material selected from the group which consists of starch, methyl cellulose, hydroxy alkyl cellulose ethers, polyvinyl alcohol, salts of cellulose glycolic acid, locust bean gum and guar gum, and sealing the cell.

2. A primary galvanic cell comprising a film-lined anode, a carbon electrode surrounded by an electrolyte-wet depolarizing mix, an inner seal between said mix and cell cover, a multi-ply washer having a single aperture of such diameter as to allow passage of the electrode, said washer fitting within the anode in contact therewith surmounting said mix, and comprising a plurality of absorbent materials separated by an electrolyte-soluble and immobilizing materials capable of swelling in said electrolyte to form a gel selected from the group consisting of starch, methyl cellulose, hydroxy alkyl cellulose ethers, polyvinyl alcohol, salts of cellulose glycolic acid, locust bean gum and guar gum.

3. A primary galvanic cell comprising a film-lined anode, a carbon electrode surrounded by an electrolyte-wet depolarizing mix, an inner seal between said mix and cell cover, a multi-ply washer having a single aperture of such diameter as to allow passage of the carbon electrode, said washer fitting within the anode in contact therewith, and comprising a plurality of absorbent materials separated by a film of 10% sodium carboxymethyl cellulose solution having a viscosity ranging from 4000 cps. to 100,000 cps.

4. A primary galvanic cell comprising a paste-lined anode, a carbon electrode surrounded by an electrolyte-wet depolarizing mix, an inner seal between said mix and cell cover, a multi-ply washer having a single aperture of such diameter as to allow passage of the carbon electrode, said washer fitting within the anode in contact therewith, and comprising a plurality of absorbent materials, mutually separated by a paste film of 10% sodium carboxymethyl cellulose having a viscosity ranging from 4000 cps. to 100,000 cps.

5. A primary galvanic cell comprising a film-lined anode, a carbon electrode surrounded by an electrolyte-wet depolarizing mix, an inner seal between said mix and cell cover, a circular multi-ply washer having a single aperture of such diameter as to allow passage of the carbon electrode, said washer fitting within the anode in contact therewith, and comprising a plurality of absorbent materials separated by a paste film of 10% sodium carboxymethyl cellulose solution having a viscosity ranging from 4000 cps. to 100,000 cps.

References Cited in the file of this patent

UNITED STATES PATENTS

| | | |
|---|---|---|
| 2,262,836 | Deibel | Nov. 18, 1941 |
| 2,542,934 | MacFarland | Feb. 20, 1951 |
| 2,606,941 | Ruben | Aug. 12, 1952 |
| 2,606,942 | Bonin | Aug. 12, 1952 |
| 2,697,736 | Goldberg et al. | Dec. 21, 1954 |
| 2,712,034 | Seavey et al. | June 28, 1955 |